March 19, 1963 K. D. SCHREYER ETAL 3,081,712
CONVEYOR TROLLEY INTERLOCKING PUSHER AND CAM SYSTEM
Filed July 7, 1959 4 Sheets-Sheet 1

INVENTORS:
KENNETH D. SCHREYER
and ROBERT W. FARREN
BY: Beau, Brooks, Buckley & Beau,
ATTORNEYS.

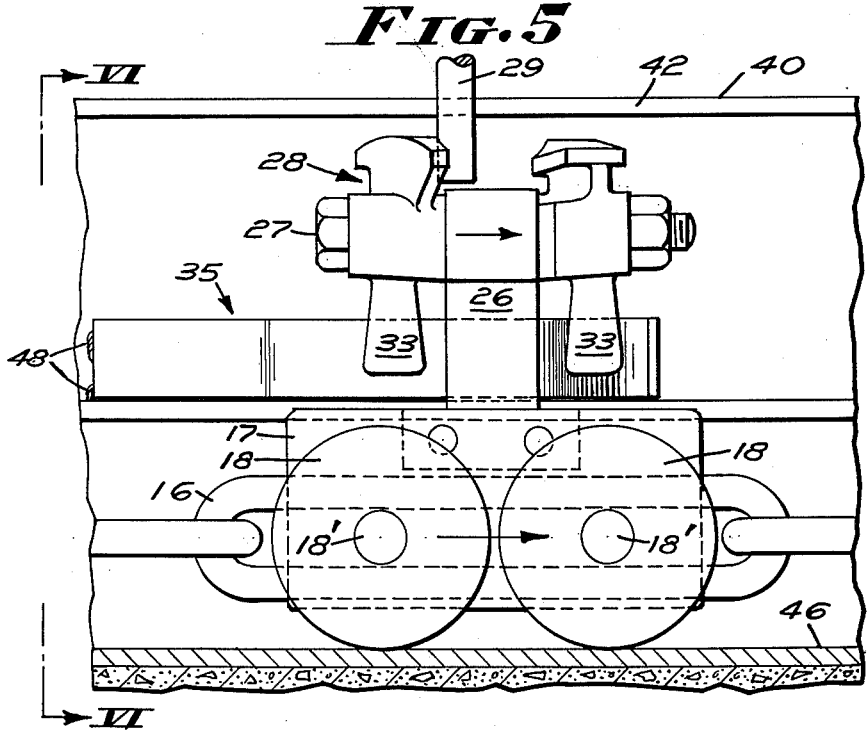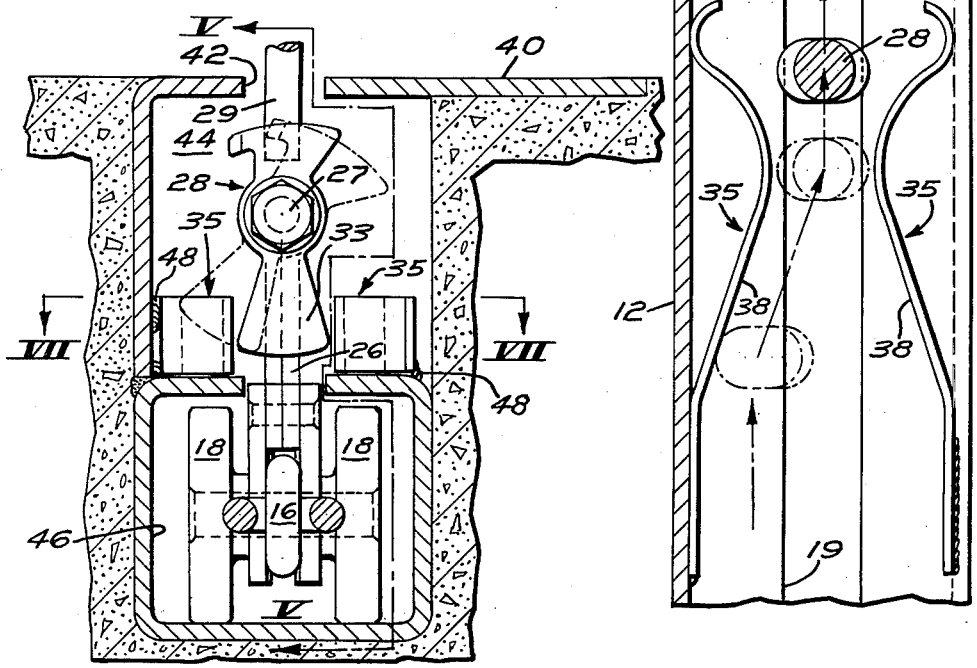

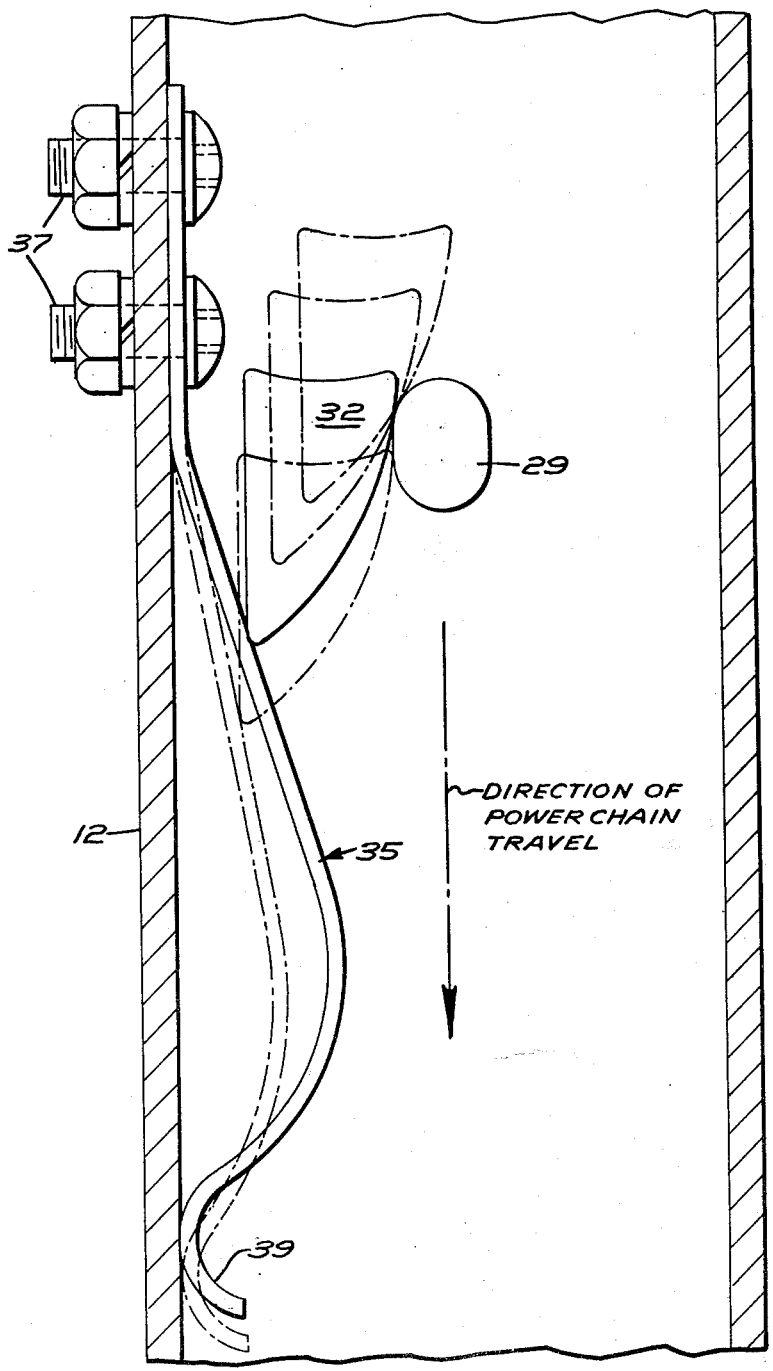

March 19, 1963 K. D. SCHREYER ETAL 3,081,712
CONVEYOR TROLLEY INTERLOCKING PUSHER AND CAM SYSTEM
Filed July 7, 1959 4 Sheets-Sheet 4
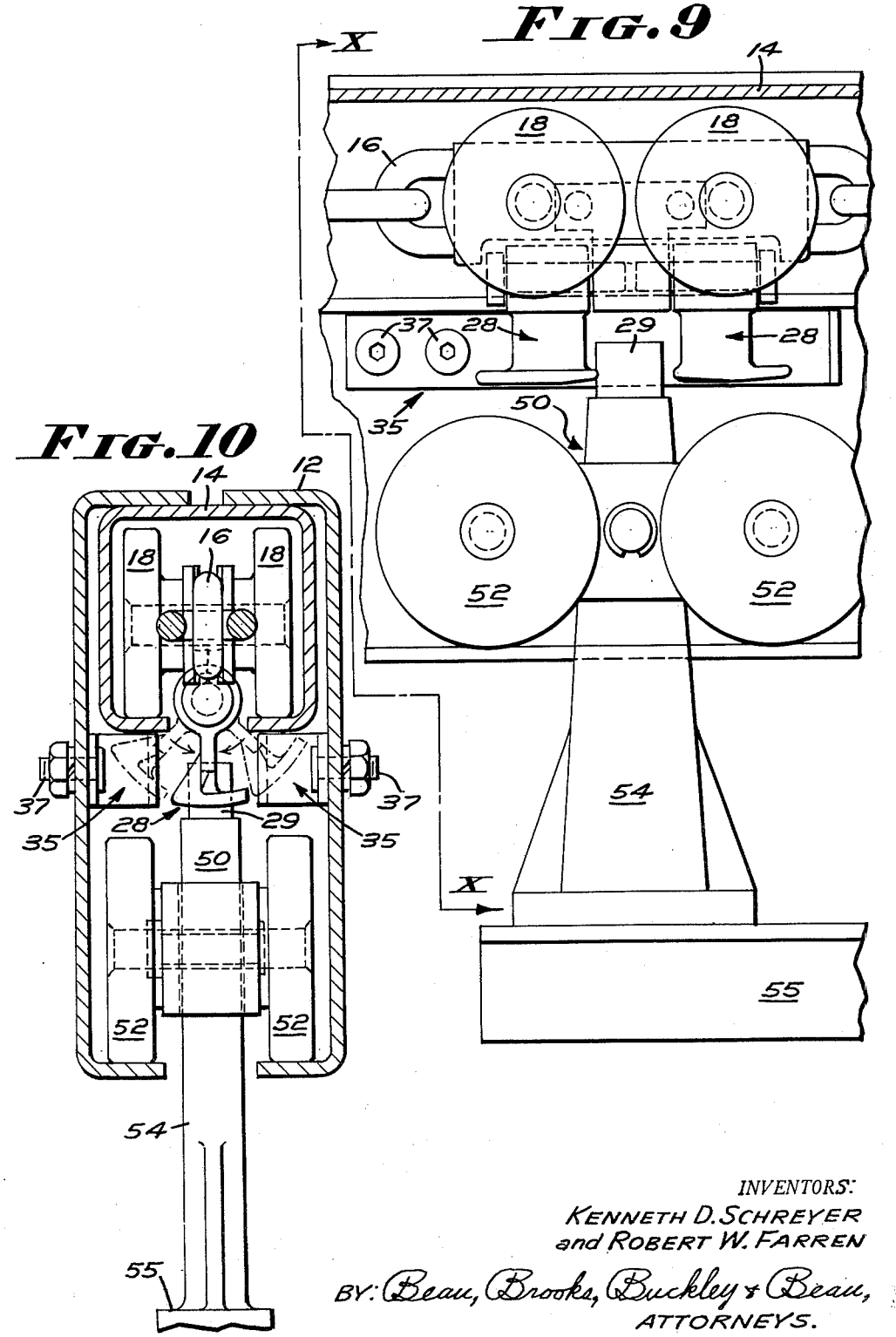
INVENTORS:
KENNETH D. SCHREYER
and ROBERT W. FARREN
BY: Beau, Brooks, Buckley & Beau,
ATTORNEYS.

United States Patent Office 3,081,712
Patented Mar. 19, 1963

3,081,712
CONVEYOR TROLLEY INTERLOCKING PUSHER
AND CAM SYSTEM
Kenneth D. Schreyer and Robert W. Farren, Williamsville, N.Y., assignors to Columbus McKinnon Corporation, Tonawanda, N.Y.
Filed July 7, 1959, Ser. No. 825,472
10 Claims. (Cl. 104—172)

This invention relates to improvements in so called power and free conveyor systems; meaning conveyor systems wherein trolleys or the like are mounted to run in trackways and to be alternately free to stand or run in response to gravity and to be picked up by parallel running power chains or the like. More particularly, the present invention relates to improvements in conveyor systems as aforesaid which employ the type of interlocking pusher mechanisms which are disclosed for example in patent application Serial No. 777,535, filed November 14, 1958, titled Interlocking Mechanism for Conveyors.

It is a primary object of the present invention to provide in conjunction with a conveyor mechanism as aforesaid, means for automatically centering the dogs which are employed in the interlocking pusher mechanisms of such systems, whenever such mechanisms are inoperative; so that whenever the pusher mechanisms arrive at trolley connection positions they will be accurately centered whereby malfunctioning of the mechanisms such as might otherwise cause trolley misses or jamming of the conveyor system will be positively avoided. Other situations involving malfunction risks occur for example when the trolley trackways enter downhill or uphill or horizontal curves, or run into switchways, and another object is to provide means whereby the trailing or "pusher" dog is positively cammed into operative position just prior to the point of trolley engagement, and the leading or "hold back" dog is positively cammed into trolley holding alignment just after it passes the engagement point. Still another object is to provide an improved mechanism as aforesaid whereby whenever an interlocking pusher dog arrives at a new trolley connection position in misalignment with the load lug to be contacted and enters the space alongside, the dog will be permitted to bypass the lug in improved manner without jamming of the conveyor system. Other objects and advantages of the invention will appear from the specification hereinafter and the drawing herewith, wherein:

FIG. 5 is a view corresponding to FIG. 2, but showing the invention as being employed in conjunction with an underfloor power chain carrying load engaging dogs for engagement with lugs extending downwardly from dollies or the like through a floor slot;

FIG. 6 is a section taken along line VI—VI of FIG. 5;

FIG. 7 is a section taken on line VII—VII of FIG. 6 showing operation of the device of the invention;

FIG. 8 is a view corresponding to FIG. 7, diagrammatically illustrating another mode of operation of the device;

FIG. 9 is a view corresponding to FIG. 2 but showing application of the invention to a trolley conveyor system of the overhead type wherein the interlocking pusher dogs are carried by the power chain instead of by the conveyor trolleys as shown in FIG. 2; and FIG. 10 is a section taken on line X—X of FIG. 9.

Figure 1:
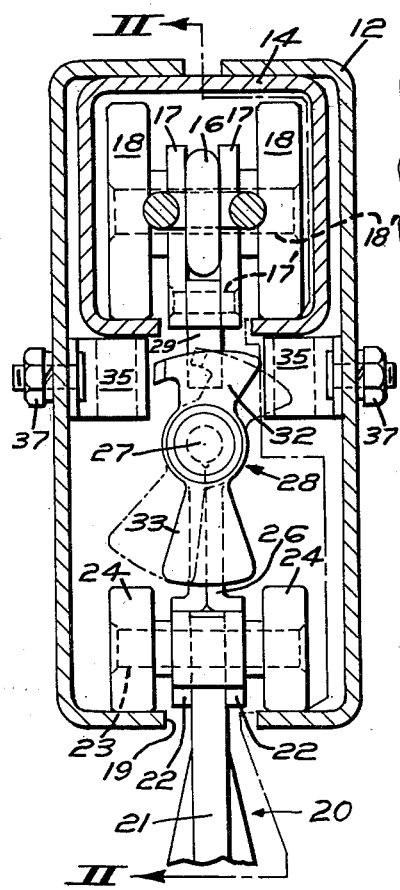
FIG. 1 is a fragmentary sectional view through a combination trolley conveyor track and powerized chain track unit of the overhead trolley type wherein the interlocking pusher dogs are carried by the trolley unit, showing the interlocking pusher mechanism in power chain engaging position.

The invention is illustrated by way of one example in FIGS. 1–4 herewith as being applied in conjunction with an overhead trolley conveyor system wherein the conveyor trolleys per se mount the interlocking pusher mechanisms. Thus, as shown in this case the trackway unit may comprise an outer housing 12 of rectangular sectional form carrying interiorly thereof a power chain track device 14. The housing member 12 will be suitably suspended from a ceiling or other support, and within the track portion 14 is mounted a drive chain 16 motivated by any suitable means, not illustrated. At predetermined spaced points therealong the chain links 16 mount pairs of laterally spaced, elongated flat links 17 which are joined together and to the chain 16 by appropriate pins 17'. The links 17 support paired roller wheels 18—18 journaled on axles 18'. The rollers 18—18 run against the inner bottom walls of the track piece 14, thereby supporting and guiding the chain 16 as it moves through the housing. The housing 12 is provided with a longitudinal slot 19 in the bottom wall thereof.

Figure 2:
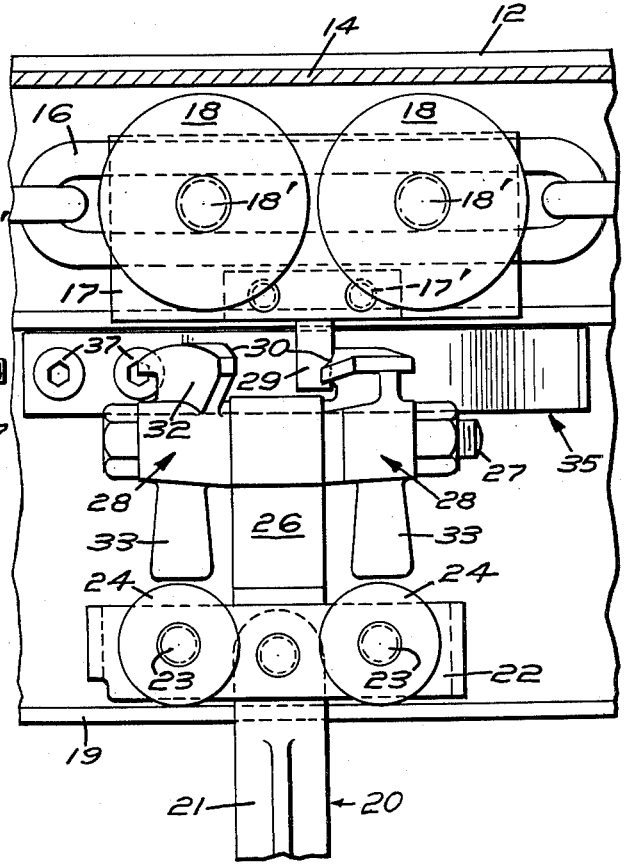
FIG. 2 is a sectional view taken along line II—II of FIG. 1.
Figure 3:
FIG. 3 is a plan view of a pusher dog cam component of the device of the present invention, in disassembled relation from the rest of the mechanism.
Figure 4:
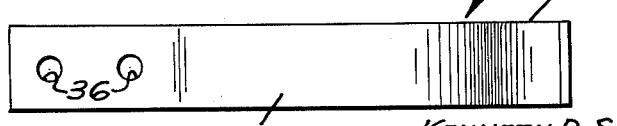
FIG. 4 is a side elevational view of the device of FIG. 3.

Load trolleys as are generally designated at 20 may each comprise a pendant body portion 21 carried by plates 22—22 and supporting pins 23 mounting rollers 24—24 running on the bottom flanges of the housing 12. The plates 22—22 also support a vertically standing stem portion 26 carrying at its upper end a bolt 27 which in turn mounts on its opposite ends pusher elements 28—28 the hub portions of which are of generally cylindrical form and are rotatably mounted on pin 27 at opposite sides of the stem portion 26. Thus, the pushers 28—28 are adapted to receive therebetween a driver lug 29 which in the embodiment of FIGS. 1-2 is carried by the power chain 16 by being suspended from the chain flat links 17.

As shown herein, the pusher elements or dogs 28—28 are identical in construction, but are mounted in opposed relation. Each pusher dog is formed with a contact portion having an inner face 30 elongated transversely of the trackway and adapted to bear against the drive lug 29; one pusher element engaging the lug 29 when the chain 16 is proceeding in one direction, and the other pusher element engaging the lug 29 when the chain is proceeding in the opposite direction. In addition, each inner face 30 is of slightly concave transverse curvature, to automatically center the lug 29 with respect to the pusher elements and thereby provide a direct and positive transfer of power from the pusher elements to the drive lug when in alinement therewith.

The outer faces of the pusher elements 28—28 are provided with cam surfaces 32 formed so that when the outer face of either pusher element abuts drive lug 29 it is auotmatically cammed thereby about pin 27 out of the path of the lug 29, thereby permitting the latter to pass into the space between the pusher elements. It is intended that the pusher element 28 which has thus been cammed out of the way by the lug 29 then swings back to its operative position as illustrated by solid lines in the drawings, under the influence of gravity acting upon a pendant weight portion 33 extending below each pusher member. Thus, it is contemplated that as the pusher mechanism is moved endwise into initial engagement with a drive lug 29 the leading pusher element 28 is automatically cammed out of interfering relation with lug 29. permitting passage of the lug into the space between the elements 28—28 for subsequent engagement by the inner face of the trailing pusher element. Once lug 29 has passed the leading pusher element, the latter is expected to automatically swing back to its operative position thereby positively locking the drive lug 29 between the pusher elements.

Therefore, it will be understood that the pusher elements are designed to yield in either direction for automatic coupling, whereby even if the lug 29 initially engages a pusher element on the side thereof, the pusher element cams aside and the lug is picked up either by the succeeding pusher element or the succeeding pusher mechanism, and that when the parts are so coupled the pushers maintain control over the trolleys at all times. Even if the trolley suddenly begins going down hill, moving away from the trailing pusher element, it will simply engage the inner face of the leading pusher element which will hold the lug coupled to the pusher. It has been determined however that under typical operating conditions the pivotal connections of the interlocking dogs 28, 28 on the mounting bolt 27, may tend in time to become dry or clogged due to accumulations of dust therein, whereby on occasion when the dogs are released from a previous locking connection the dogs fail to pivot back freely to upright accurately centered positions.

It is a particular feature of the present invention that an extra safeguard is provided to insure that the interlocking pusher lugs are hanging in true vertical positions as they approach conveyor stations wherein interlocking connections between the pusher dogs and the trolley lugs are anticipated. For this purpose as shown in FIGS. 1-4, a cam device as indicated generally at 35 is fixed to each opposite interior side wall portion of the trackway housing 12. As shown herein, the cam members 35 may be of leaf spring form, apertured at one end as indicated at 36 and bolted thereat as by means of bolts 37 to the housing sidewalls. Thus the cam devices extend in cantilever fashion lengthwise of the trackway at opposite sides of the intended path of travel of the pusher dogs 28, as the power chain drives them towards the trolley pick up station.

More specifically as shown herein, the cam devices 35 are formed with slightly sloping camming surface portions 38 against which any misaligned pusher dogs will bear when entering the area between the oppositely disposed cam devices 35—35. The cam surfaces 38 lead into reverse bent end portions 39 (FIG. 3) arranged to bear laterally against the inner wall surfaces of the housing 12, to stabilize the cam devices while at the same time permitting them to yield in response to any excessive pressures thereagainst such as may occur whenever a pusher dog somehow manages to become wedged sidewise between a trolley lug 29 and one of the cam members 35. Thus, whereas it is intended that the cam devices 35—35 will normally operate to bias any previously misaligned dog into the center of the trackway as illustrated diagrammatically for example by FIG. 7, and thus into position to squarely connect with the next encountered trolley lug, in event an occasion arises whereby the pusher dog portion 28 wedges itself into a position alongside a trolley lug, as illustrated diagrammatically by FIG. 8, the cam member 35 will flex inwardly as illustrated by the broken lines shown in FIG. 8 so as to permit the dog 32 to pass by the lug 29 without causing any damage to the system.

FIGS. 5 and 6 illustrate application of the present invention to an under floor power chain arrangement wherein the floor line is indicated at 40 and a slotway 42 is provided for extensions of the trolley lugs 29 downwardly into an under floor chamber 44. The power chain trackway as indicated at 46 is disposed in the bottom of the under floor chamber 44, and encloses the power chain device as explained hereinabove in connection with FIGS. 1-2. In this case however the power chain mounts the stems 26 carrying the pins 27 which in turn support the pusher dogs 28. Thus it will be appreciated that as the power chain travels through the trackway 46 it carries with it at predetermined intervals therealong pairs of interlocking pusher dogs 28—28 for intermittent engagement with the lugs 29 extending through the slotway 42 from load trolleys or dollies or the like such as will be arranged to run upon the floor surface 30. In this case the dog camming devices 35—35 are conveniently mounted to extend in the direction of the trackway as by welding them at one end (48, FIG. 5) to the trackway housing, so that their sloping cam surfaces 38 are disposed to guide any misaligned pusher dogs into upright centered hanging positions as explained hereinabove; the camming contacts between the cam members 35 and the pusher dogs being in this case made against the counterweight portions 33 of the pusher dogs.

FIGS. 9, 10 illustrate application of the invention to still another form of conveyor arrangement wherein the power chain is disposed to run in an overhead trackway (as in the case of FIGS. 1 and 2) but wherein the power chain per se carries the interlocking pusher dog units to extend downwardly into a trolley track portion of the trackway for engagement with lug devices extending upwardly from trolley members 50. Thus, the trolley posts 50 are each carried by pluralities of rollers 52 running on the bottom flanges of the housing 12 and support depending brackets 54 which connect at their bottom ends to horizontal load carrying rails 55. Thus it will be appreciated that in this case also, the cams 35—35 may be conveniently mounted against opposite sidewalls of the trackway housing 12 so as to align the cams 35—35 with the traveling pusher dogs in such manner that whenever a pusher dog arrives at the position of the cams 35—35 it will be thereby guided to pivot into vertically hanging and accurately aligned position relative to the trolley pick up lugs 29. However, as explained hereinabove, in event that a pusher dog manages to wedge itself laterally in between a trolley lug 29 and one of the cam members 35, the latter will yield sufficiently to enable the pusher dog to travel through and alongside the trolley lug 29 until it again becomes free, without causing any damage to the conveyor system.

Thus, it will be appreciated that although only a few forms of the invention have been shown and described in detail hereinabove, various changes may be made therein without departing from the spirit of the invention or the scope of the following claims.

What is claimed is:
1. In a conveyor system, in combination,
   a load carrying driven member and a driving member therefor,
   a trackway assembly for guiding said driven member and said driving member and including at least one pick up station therealong,
   one of said members having a rigid lug projecting toward the other member,
   said other member having a pair of dogs pivotally attached thereto about axes parallel to the direction of travel of said other member and disposed in longitudinally spaced relation to each other,
   said dogs having opposed faces extending generally transverse to their pivotal axes to present opposed abutment surfaces to hold said lug captive therebetween and being weighted to assume normal positions in which said lug is captive,
   at least one of said dogs having an outer face extending angularly with respect to the aforesaid pivotal axes to present a cam surface engageable with said lug at said pick up station to momentarily pivot said one dog to one side to permit said lug to be disposed between said dogs,
   the improvement consisting of cam means carried by said trackway assembly in the path of movement of said dogs adjacent said pick up station to assure normal positioning of said dogs to hold said lug captive therebetween.
2. In the assembly as defined in claim 1 wherein there are two such cam means, one on either side of said pick up station to assure normal positioning of said dogs both upon approaching and upon leaving said pick up station.

3. In the assembly as defined in claim 2 wherein each cam means is resilient to permit misaligned and jammed dogs to pass thereby without damage.

4. In the assembly as defined in claim 2 wherein each cam means is in the form of a pair of leaf spring members extending from opposite sides of said trackway assembly towards the center thereof.

5. In the assembly as defined in claim 1 wherein said cam means is resilient to permit misaligned and jammed dogs to pass thereby without damage.

6. In the assembly as defined in claim 1 wherein said cam means is in the form of a pair of leaf spring members extending from opposite sides of said trackway assembly toward the center thereof.

7. In a conveyor system, in combination, a load carrying driven member and a driving member therefor, a trackway assembly for guiding said members and including at least one pick up station therealong, said driven member having a lug rigid therewith and projecting toward said driving member, said driving member having a pair of longitudinally spaced dogs pivotally attached thereto about axes parallel to the direction of travel of said driving member, said dogs having opposed inner faces extending generally transverse to said direction of travel to present opposed abutment surfaces to hold said lug captive therebetween and being weighted to assume normal positions in which said lug is captive as aforesaid, at least the leading one of said dogs having its outer face extending angularly with respect to said direction of travel to present a cam face engageable with said lug at said pick up station to momentarily pivot said leading dog to one side to permit said lug to be engaged by said abutment face of the trailing dog, the improvement consisting of cam means carried by said trackway assembly ahead of said pick up station in the path of movement of said dogs to assure normal positioning of said trailing dog to drive said driven member and cam means beyond said pick up station to assure normal positioning of said leading dog to prevent the driven member from overrunning said driving member.

8. In a conveyor system, in combination, a load carrying driven member and a driving member therefor, a trackway assembly for guiding said members and including at least one pick up station therealong, said driving member having a lug rigid therewith and projecting toward said driven member, said driven member having a pair of longitudinally spaced dogs pivotally attached thereto about axes parallel to the direction of travel of said driven member, said dogs having opposed inner faces extending generally transverse to said direction of travel to present opposed abutment surfaces to hold said lug captive therebetween and being weighted to assume normal positions in which said lug is captive as aforesaid, at least the trailing one of said dogs having its outer face extending angularly with respect to said direction of travel to present a cam face engageable by said lug at said pick up station to momentarily pivot said trailing dog to one side to permit said lug to engage said abutment face of the leading dog, the improvement consisting of cam means carried by said trackway assembly ahead of said pick up station in the path of movement of said dogs to assure normal positioning of said leading dog for driven engagement by said lug and cam means beyond said pick up station to assure normal positioning of said trailing dog to prevent the driven member from overrunning said driving member.

9. In the assembly as defined in claim 7 wherein each cam means is resilient to permit misaligned and jammed dogs to pass thereby without damage.

10. In the assembly as defined in claim 8 wherein each cam means is resilient to permit misaligned and jammed dogs to pass thereby without damage.

References Cited in the file of this patent

UNITED STATES PATENTS

| | | |
|---|---|---|
| 790,828 | Gunckel | May 23, 1905 |
| 801,523 | Hinchman | Oct. 10, 1905 |
| 1,083,308 | Thurston | Jan. 6, 1914 |
| 2,101,353 | Waalkes | Dec. 7, 1937 |
| 2,593,699 | Rose | Apr. 22, 1952 |
| 2,621,609 | McCaul | Dec. 16, 1952 |
| 2,661,828 | Vogt et al. | Dec. 8, 1953 |
| 2,689,036 | Mullen et al. | Sept. 14, 1954 |
| 2,704,038 | Horton | Mar. 15, 1955 |
| 2,839,009 | Francis | June 17, 1958 |
| 2,977,894 | Mordick et al. | Apr. 4, 1961 |

FOREIGN PATENTS

| | | |
|---|---|---|
| 41,752 | France | Jan. 16, 1933 |
| | (Addition to No. 653,926) | |
| 127,637 | Germany | Jan. 30, 1902 |
| 766,453 | Great Britain | Jan. 23, 1957 |